(12) United States Patent
Torii

(10) Patent No.: US 7,871,103 B2
(45) Date of Patent: Jan. 18, 2011

(54) INTERIOR TRIM ARTICLE-MOUNTING STRUCTURE OF VEHICLE EQUIPPED WITH HEAD PROTECTION AIRBAG APPARATUS

(75) Inventor: Nobuyuki Torii, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 13 days.

(21) Appl. No.: 12/280,807

(22) PCT Filed: Sep. 6, 2007

(86) PCT No.: PCT/IB2007/002560

§ 371 (c)(1),
(2), (4) Date: Aug. 27, 2008

(87) PCT Pub. No.: WO2008/032159

PCT Pub. Date: Mar. 20, 2008

(65) Prior Publication Data

US 2009/0206580 A1    Aug. 20, 2009

(30) Foreign Application Priority Data

Sep. 8, 2006    (JP) .............................. 2006-244137

(51) Int. Cl.
B60R 21/213    (2006.01)
(52) U.S. Cl. .............. 280/728.2; 280/728.3; 280/730.2; 280/733; 24/457

(58) Field of Classification Search .............. 280/728.2, 280/730.2, 733, 728.3; 24/457, 458; 296/1.02, 296/214

See application file for complete search history.

(56) References Cited

U.S. PATENT DOCUMENTS

| 5,931,493 A | * | 8/1999 | Sutherland ............... 280/730.1 |
| 6,168,186 B1 | | 1/2001 | Welch et al. |
| 6,394,695 B1 | * | 5/2002 | Chausset .................... 403/397 |
| 6,402,188 B1 | | 6/2002 | Pasch |
| 6,431,585 B1 | * | 8/2002 | Rickabus et al. ......... 280/728.3 |

(Continued)

FOREIGN PATENT DOCUMENTS

DE    198 38 069 A1    3/2000

(Continued)

OTHER PUBLICATIONS

Japanese Office Action dated Jul. 1, 2008 for corresponding Japanese Application No. JP 2006-244137.

*Primary Examiner*—Paul N Dickson
*Assistant Examiner*—James English
(74) *Attorney, Agent, or Firm*—Finnegan, Henderson, Farabow, Garrett & Dunner, LLP

(57) ABSTRACT

A bezel (44) of a coat hook-equipped roof side register (42) is fixed by fastening, at the coat hook main body portion (50) side, to a mount bracket (76) on a body side by a mount bolt (72), and is elastically engaged, at a louver (84) side, with a mount bracket (108) on the body side by an engaging member (106). Furthermore, a first end portion (110A) of a strap (110) is fixed to the bezel (44) by a screw (114). A second end portion (110B) of the strap (110) is fastened together with the coat hook main body portion (50) to the mount bracket (76) by the mount bolt (72).

12 Claims, 9 Drawing Sheets

U.S. PATENT DOCUMENTS

| | | | |
|---|---|---|---|
| 6,565,116 B1 * | 5/2003 | Tajima et al. | 280/730.2 |
| 6,565,117 B2 | 5/2003 | Kubota et al. | |
| 6,616,222 B1 * | 9/2003 | Ponceau | 296/214 |
| 6,664,470 B2 * | 12/2003 | Nagamoto | 174/652 |
| 6,863,300 B2 * | 3/2005 | Ryu | 280/730.2 |
| 7,077,449 B2 * | 7/2006 | Tokunaga | 296/39.1 |
| 7,338,068 B2 * | 3/2008 | Kawai et al. | 280/728.2 |
| 7,654,558 B2 * | 2/2010 | Choi | 280/728.2 |
| 2002/0113465 A1 * | 8/2002 | Inari et al. | 296/214 |
| 2003/0146607 A1 * | 8/2003 | Ohki | 280/730.2 |
| 2006/0192368 A1 * | 8/2006 | Hall et al. | 280/730.2 |
| 2007/0096440 A1 * | 5/2007 | Purvis et al. | 280/728.3 |
| 2007/0228702 A1 * | 10/2007 | Ono et al. | 280/730.2 |

FOREIGN PATENT DOCUMENTS

| | | |
|---|---|---|
| EP | 1 419 940 A1 | 5/2004 |
| JP | 11-091489 A | 4/1999 |
| JP | 2006-103426 A | 4/1999 |
| JP | 2001-58555 | 3/2001 |
| JP | 3485038 | 10/2003 |
| JP | 3497452 | 11/2003 |

\* cited by examiner

INTERIOR TRIM ARTICLE-MOUNTING STRUCTURE OF VEHICLE EQUIPPED WITH HEAD PROTECTION AIRBAG APPARATUS

CROSS-REFERENCE TO RELATED APPLICATIONS

This application is a national phase application of International Application No. PCT/IB2007/002560, filed Sep. 6, 2007, and claims the priority of Japanese Application No. 2006-244137, filed Sep. 8, 2006, the contents of both of which are incorporated herein by reference.

BACKGROUND OF THE INVENTION

1. Field of the Invention

This invention relates to an interior trim article-mounting structure that is applied to the case where an interior trim article is disposed in a terminal end portion of a headliner in a vehicle equipped with a head protection airbag apparatus.

2. Description of the Related Art

As a supplemental occupant protection device, a head protection airbag apparatus that deploys an airbag downward of a roof side rail portion in a fashion of a curtain at the time of a side collision or a rollover is now mounted in many cases.

Japanese Patent No. 3485038 ("JP-B2-3485038") discloses this type of a head protection airbag apparatus. The head protection airbag apparatus described in JP-B2-3485038 is constructed considering that an interior trim article, such as a room lamp or the like, is disposed on a periphery portion of a headliner. In an airbag apparatus disclosed in JP-B2-3485038, a clip that is inserted into a mount hole of a roof side rail inner panel from the compartment side of a terminal end portion of a headliner so as to fix an interior trim article thereto has an integrally formed claw for fall-apart prevention. Then, when the airbag inflates and deploys forcing open a terminal end portion of the headliner, the clip's claw engages with the mount hole of the terminal end portion of the headliner.

The structure for preventing an interior trim article from falling apart as shown in JP-B2-3485038 is useful. However, in a head protection airbag apparatus that deploys an airbag along front and rear seats, the inflator is often disposed in a middle portion (near an upper end portion of the center pillar), and there is a trend toward high powers of gas from the inflators. Considering these factors, a more reliable measure for preventing the scattering of an interior trim article is desired.

SUMMARY OF THE INVENTION

The present invention provides an interior trim article-mounting structure of a vehicle equipped with a head protection airbag apparatus which more reliably prevents the scattering of an interior trim article that is disposed at a terminal end portion of a headliner.

A first aspect of the invention is an interior trim article-mounting structure for application to a vehicle equipped with a head protection airbag apparatus that includes an inflator disposed at a predetermined position in the vehicle, and an airbag at least a portion of which is housed in a folded state between a roof side rail and a terminal end portion of a headliner, and which, when supplied with gas from the inflator, inflates and deploys downward of the roof side rail, pushing open the terminal end portion of the headliner toward an inner side relative to a vehicle compartment. The mounting structure includes: an interior trim article that includes a main body portion fixed by junction to the roof side rail, and a bezel fixed to at least one of the main body portion and the roof side rail by an engagement that uses an elastically deformable claw; an opening portion which is formed in the terminal end portion of the headliner so that the interior trim article is mounted to the opening portion, and on a periphery portion of which a predetermined amount of a periphery portion of the bezel is latched in when the interior trim article is set in the terminal end portion of the headliner; and a linking member that links the bezel and one of the main body portion and the roof side rail. The linking member is elongated, and an intermediate portion thereof has a surplus length portion.

According to the first aspect, when the inflator disposed at a predetermined position in the vehicle activates, gas is supplied into the airbag. Therefore, the airbag inflates, and deploys downward of the roof side rail, pushing open the terminal end portion of the headliner toward the inner side relative to the vehicle compartment. In this manner, the head of an occupant is protected.

The foregoing aspect of the invention is intended for a vehicle in which an interior trim article that includes a main body portion and a bezel is set in a terminal end portion of a headliner. In a state where the interior trim article has been assembled to the terminal end portion of the headliner, a periphery portion of the bezel is latched on the periphery portion of the interior trim article-mounting opening portion formed in the terminal end portion of the headliner.

Therefore, for example, if the central disposition of the inflator, high powers of gas from the inflators, or the like is accomplished, there will occur a possibility that, when the airbag inflates and deploys pushing open the terminal end portion of the headliner toward the inner side relative to the vehicle compartment, the force from the terminal end portion may elastically deform a claw that fixes the bezel to the main body portion in a fall-apart direction so that the bezel may actually fall apart and scatter toward the inner side relative to the compartment.

However, in the foregoing aspect, if the bezel falls apart from the main body portion or the roof side rail, the bezel merely hangs via the linking member extending from the opening portion, and does not scatter.

Particularly, in the foregoing aspect, if the claw falls apart or breaks due to a high load that acts during an early period of the deployment of the airbag, the high load does not act on the fixture point of the main body portion of the interior trim article to the roof side rail. Specifically, in the invention, since the high load occurring during the early period of the deployment of the airbag is relieved while the surplus length portion of the linking member unfolds, the high load during the early period does not act on the point at which the roof side rail of the coat hook main body portion is fixed to the mount bracket. Therefore, the fixture site of the main body portion of the interior trim article to the roof side rail will not break. In this respect, too, the main body portion or the bezel of the interior trim article will not scatter.

According to the first aspect, it is possible to more reliably prevent the scattering of the interior trim article disposed in the terminal end portion of the headliner.

In the first aspect of the invention, the main body portion may be fixed to the roof side rail by fastening. Furthermore, an end portion of the linking member which is opposite from a bezel side may be fastened together with the main body portion of the interior trim article when the main body portion is fixed by fastening to the roof side rail.

According to the foregoing constructions, the number of component parts and the number of assembly man-hours can be reduced in comparison with the case where the end portion of the linking member which is opposite from the bezel is independently fixed separately from the fastening fixture of the main body portion of the interior trim article.

According to the foregoing construction, the scattering of the interior trim article disposed in the terminal end portion of the headliner can be prevented at low costs.

In the foregoing construction, an end portion of the linking member which is opposite from a bezel side may be fixed to the roof side rail. Furthermore, an end portion of the linking member which is opposite from a bezel side may be fixed to the main body portion of the interior trim article.

In the foregoing aspect, the bezel and the main body portion may be fixed by engagement between an engaging protrusion provided in one of the bezel and the main body portion and an engaging hole provided in another one of the bezel and the main body portion. Furthermore, the bezel of the interior trim article and the roof side rail may be fixed by engagement between an engaging member, which is provided in one of the bezel and the roof side rail and which is constructed of a leaf spring, and a bracket provided in another one of the bezel and the roof side rail.

In the foregoing aspect, an entire length of the linking member may be set to be greater than a distance between a fixture position of a first end portion of the linking member and a fixture position of a second end portion of the linking member in a mounted state where the linking member is mounted on the interior trim article. In this case, the surplus length portion is a slack portion of the linking member that occurs in the mounted state.

In the foregoing aspect, the surplus length portion of the linking member may be bundled by a bundling member that breaks when a load of a predetermined value or greater is input at time of inflation and deployment of the airbag.

According to the foregoing constructions, it is possible to prevent the surplus length portion from tangling at the time of the assembly of the interior trim article, and it is also possible to prevent the surplus length portion from tangling when the linking member is unfolded and elongated as the airbag inflates and deploys.

According to the foregoing constructions, it is possible to prevent inhibition of the assembly operation for the interior trim article, and it is also possible to avoid an event where at the time of the inflation and deployment of the airbag, the linking member tangles so that the high load during an early period of the deployment acts on the junction site between the main body portion of the interior trim article and the roof side rail.

In the foregoing construction, the surplus length portion may be repeatedly folded at a predetermined length, and folded portions of the surplus length portion may be bundled by the bundling member.

In the foregoing aspect, two end portions of the linking member may be fixed to the main body portion and the bezel of the interior trim article before the main body portion of the interior trim article is fixed to the roof side rail.

According to the foregoing constructions, the interior trim article, which includes the main body portion, the bezel and the linking member, can be sub-assembled at a stage before the interior trim article is assembled to the roof side rail.

According to the foregoing constructions, it is possible to improve the operability of the assembly of the interior trim article to the roof side rail, and it is also possible to prevent an event where a component part, such as the main body portion, the bezel, etc., is lost at a stage prior to the assembly of the interior trim article.

In the foregoing aspect, the interior trim article may be a coat hook-equipped roof side register. Furthermore, the interior trim article may be a coat hook.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Figure 1:
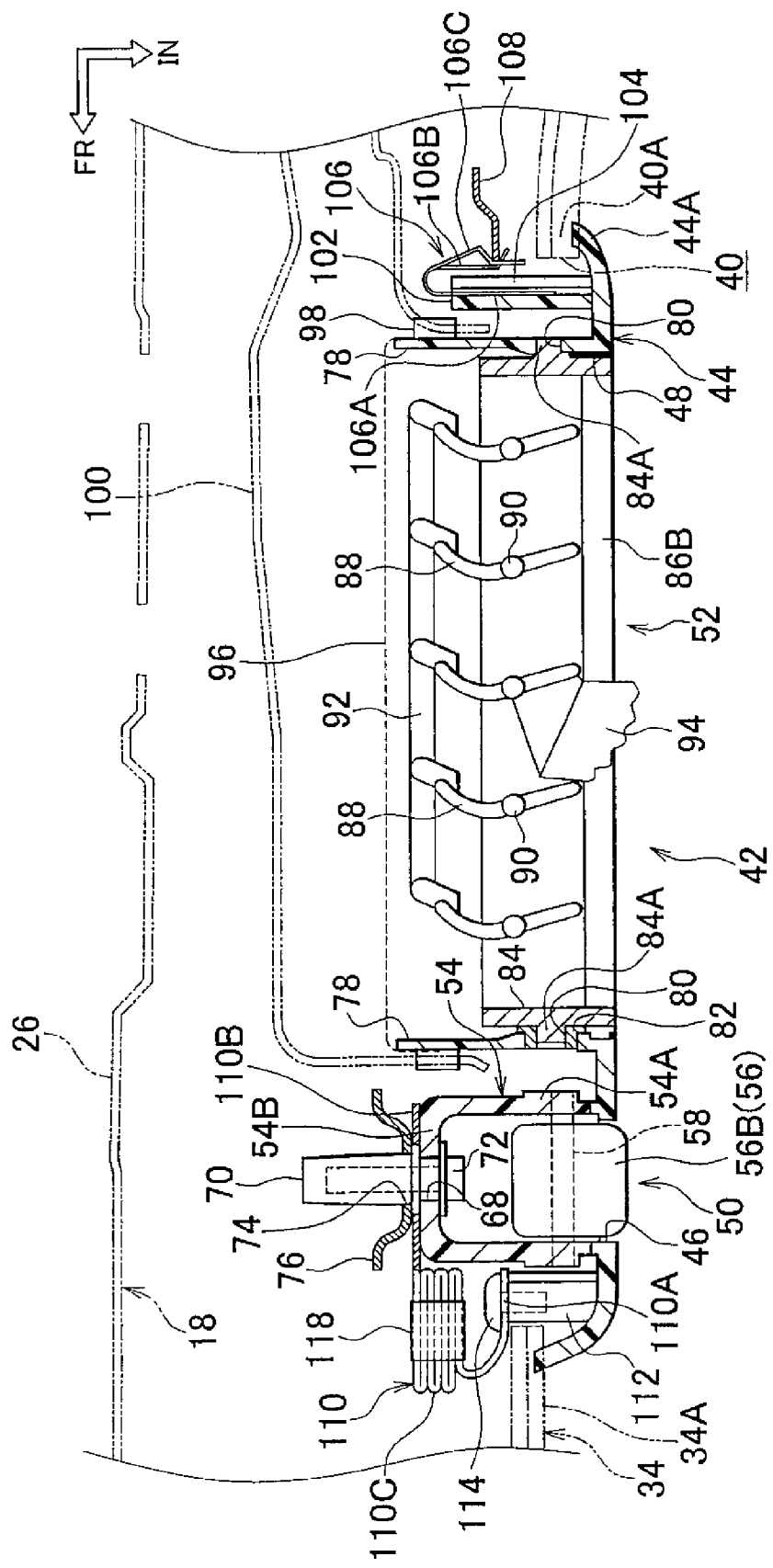
FIG. 1 is a fragmental enlarged sectional view taken along a line I-I of FIG. 3, showing an interior trim article-mounting structure of a vehicle equipped with a head protection airbag apparatus in accordance with a first embodiment of the invention.

With reference to FIGS. 1 to 6, a first embodiment of the interior trim article-mounting structure of a vehicle equipped with a head protection airbag apparatus in accordance with the invention will be described. Arrows are provided in the drawing to indicate directions, the FR arrow indicating the front of the vehicle, the UP arrow indicating the upward direction of the vehicle, and the IN arrow indicating an inward direction in the lateral direction of the vehicle.

An overall construction of a head protection airbag apparatus 10 will be described.

As shown in these drawings, the head protection airbag apparatus 10 includes an airbag 20 and a generally cylindrical inflator 22. The airbag 20 is disposed in a folded state along roof side rail 18, extending astride a front pillar (A pillar) 12, a center pillar (B pillar) 14, and a quarter pillar (C pillar) 16. The inflator 22 is disposed at and connected to an approximately middle portion of the airbag 20 in the lengthwise direction.

Mounting pieces 24 are formed on the upper edge of the air bag 20 at appropriate intervals. The mounting pieces 24 are attached to a roof side rail inner of the roof side rail 18, using bolts and weld nuts, to hold the air bag 20 to the body. The air bag 20 has a front chamber 20A that expands at the side of the head of a front-seat occupant, and a rear chamber 20B that expands at the side of the head of a rear-seat occupant. Additionally, the inflator 22 that expands and deploys the air bag 20 is tightened and held by a bracket (not shown) to the roof side rail inner of the roof side rail 18, using bolts and weld nuts. A fin-shaped connecting part 20C is integrally formed to the upper edge side in the vicinity of the center of air bag 20 in the longitudinal direction, and gas discharge port 22A of the inflator 22 is connected to this connecting part 20C.

The inflator 22 is connected to an air bag ECU (a control portion) (not illustrated) disposed, for example, below a console box. The inflator 22 is electrically powered and operates to generate gas when a side impact detection sensor (not illustrated) disposed, for example, below the center pillar 14 or when a rollover detection sensor (not illustrated) disposed, for example, within the air bag ECU, detects a side impact condition or a rollover condition.

Figure 2:
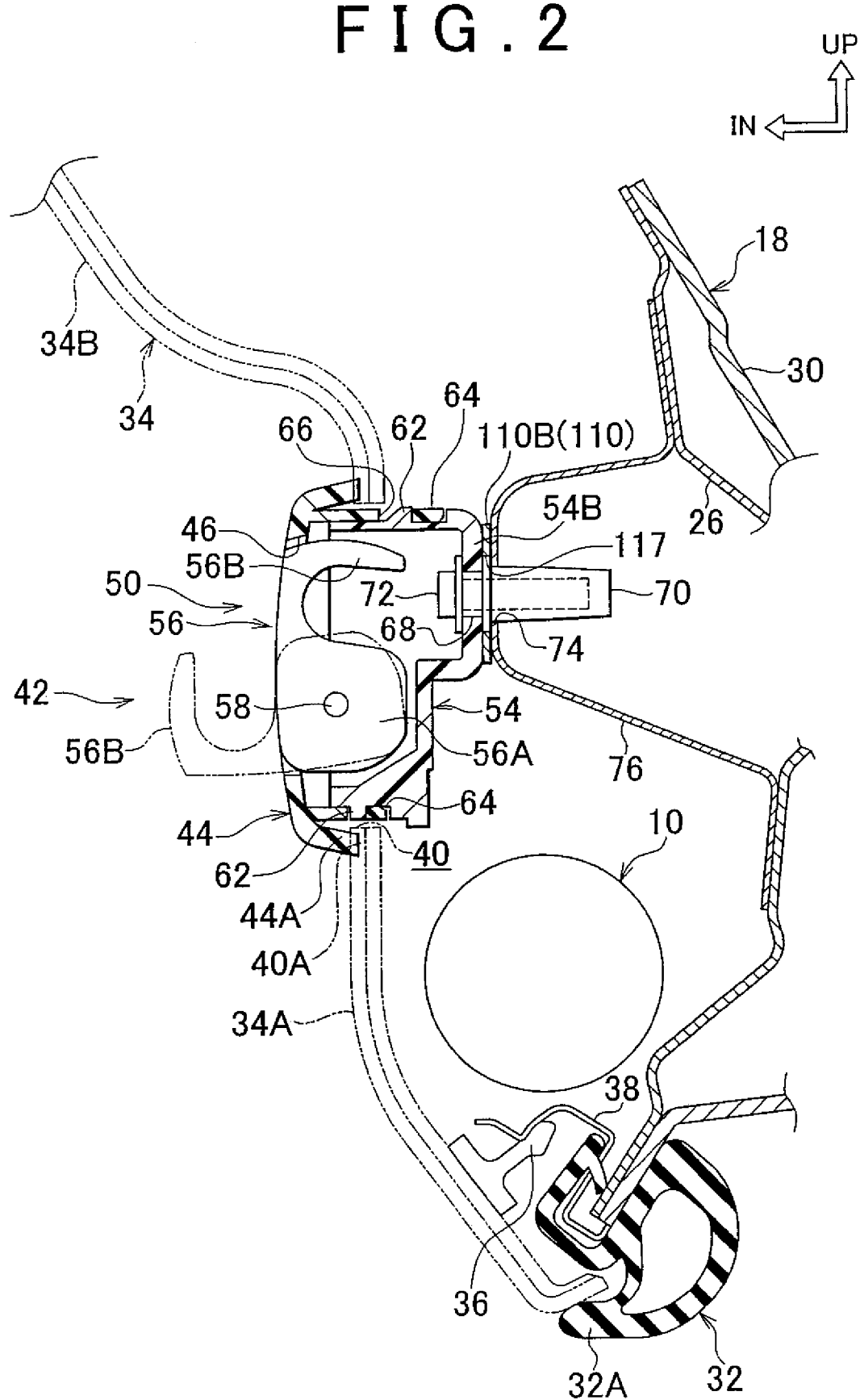
FIG. 2 is a fragmental enlarged sectional view taken along a line II-II of FIG. 3, showing the interior trim article-mounting structure of the vehicle equipped with the head protection airbag apparatus in accordance with the first embodiment.
Figure 3:
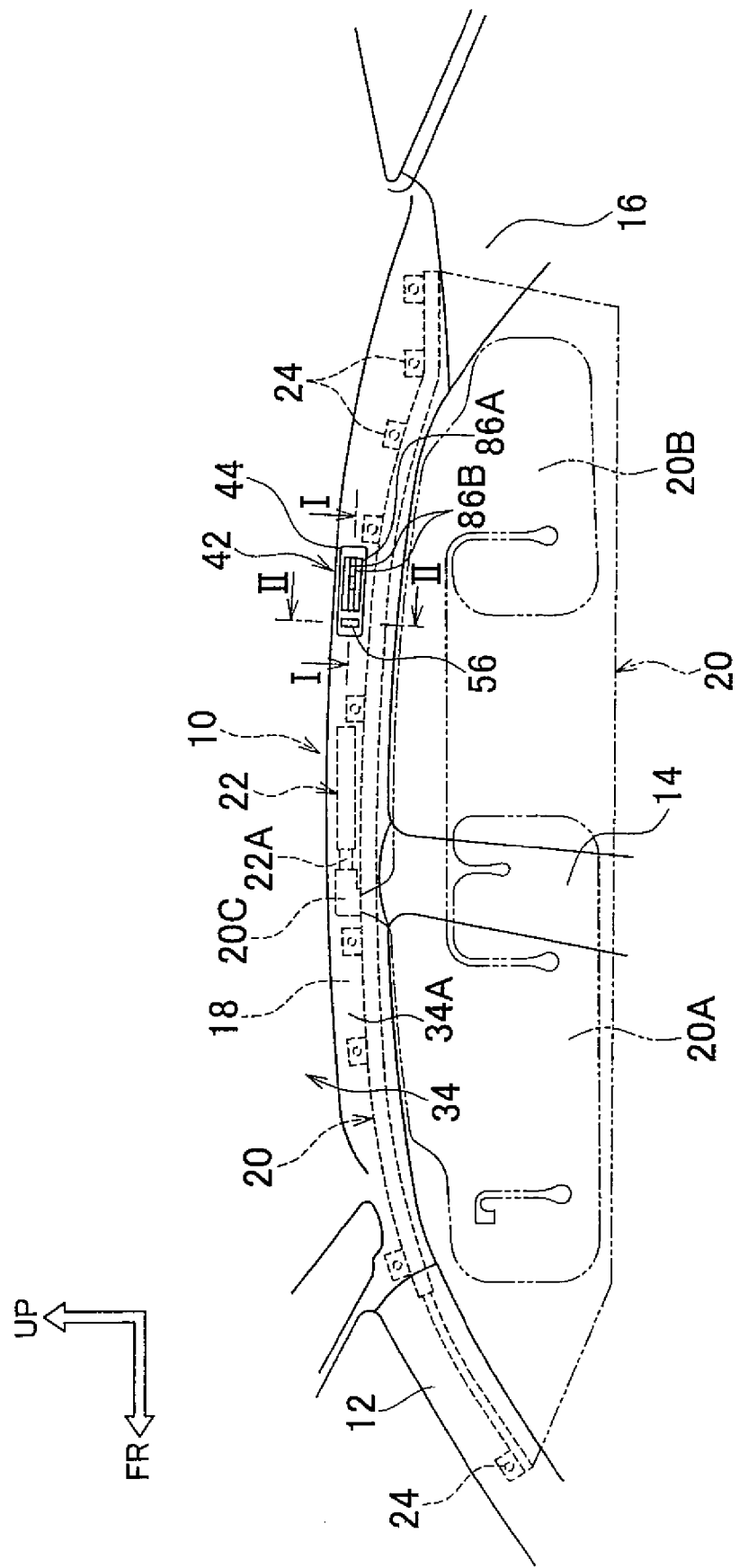
FIG. 3 is a side view of the vehicle equipped with the head protection airbag apparatus in accordance with the first embodiment, viewed from inside the vehicle compartment.

As shown in FIG. 2, as for the roof side rail 18, the roof side rail inner 26 disposed on an inner side relative to the compartment, and a roof side rail outer 30 which is disposed at a side that is outer relative to the vehicle compartment and which has a generally hat-like cross-sectional shape (only a portion of the cross-sectional shape of the roof side rail outer 30 is shown in FIG. 2) are disposed so as to form a closed cross-section. Upper and lower flange portions of the roof side rail inner 26 are Joined to upper and lower flange portions of the roof side rail outer 30 by spot-welding. A door opening trim 32 is elastically fitted to a joint portion between the lower flange portion of the roof side rail inner 26 and the lower flange portion of the roof side rail outer 30.

The head protection airbag apparatus 10 is covered with a terminal end portion 34A of a headliner 34. Specifically, the terminal end portion 34A of the headliner 34 in the vehicle width direction bends and hangs downward relative to the vehicle from a general portion 34B of the headliner 34. A distal end portion (lower end portion) of the terminal end portion 34A is latched on a fin portion 32A of the door opening trim 32. Furthermore, a resin clip 36 is mounted near the terminal end portion 34A of the headliner 34 at a position where a coat hook is disposed (described later) (a position of section on a II-II-line of FIG. 3). The resin clip 36 is elastically latched on a hook 38 that is a generally hat-shape spring member that is mounted on the vehicle compartment side of the lower flange portion of the roof side rail outer 30.

An interior trim article and a mounting structure for the interior trim article will be described. A rectangular opening portion 40 (see FIGS. 1 and 2) that is elongated in the vehicle longitudinal direction and that is provided for mounting an interior trim article is formed at a predetermined position in the terminal end portion 34A of the headliner 34 (in this embodiment, a position that is an approximately middle position between the center pillar 14 and the quarter pillar 16 and that corresponds to the rear seat side). A coat hook-equipped roof side register 42 as an interior trim article is disposed at the opening portion 40.

As shown in FIGS. 1, 2, 4 and 5, the coat hook-equipped roof side register 42 has a generally rectangular frame-shape bezel 44 that is fitted into the interior trim article-mounting opening portion 40 that is formed in the terminal end portion 34A of the headliner 34. An external dimension of a periphery portion 44A of the bezel 44 is set to be slightly larger than the opening dimension of a periphery portion 40A of the opening portion 40 of the terminal end portion 34A. In a state after the bezel 44 has been attached to the terminal end portion 34A, a predetermined amount of the periphery portion 44A of the bezel 44 is latched on the periphery portion 40A of the opening portion 40 of the terminal end portion 34A (see FIGS. 1 and 2).

A front end portion of the bezel 44 has a first opening portion 46, and a central portion of the bezel 44 has a second opening portion 48. A coat hook main body portion 50 as a main body portion of the interior trim article, is fittingly attached to the first opening portion 46. Besides, a roof side register main body portion 52 is fittingly attached to the second opening portion 48.

Figure 4:
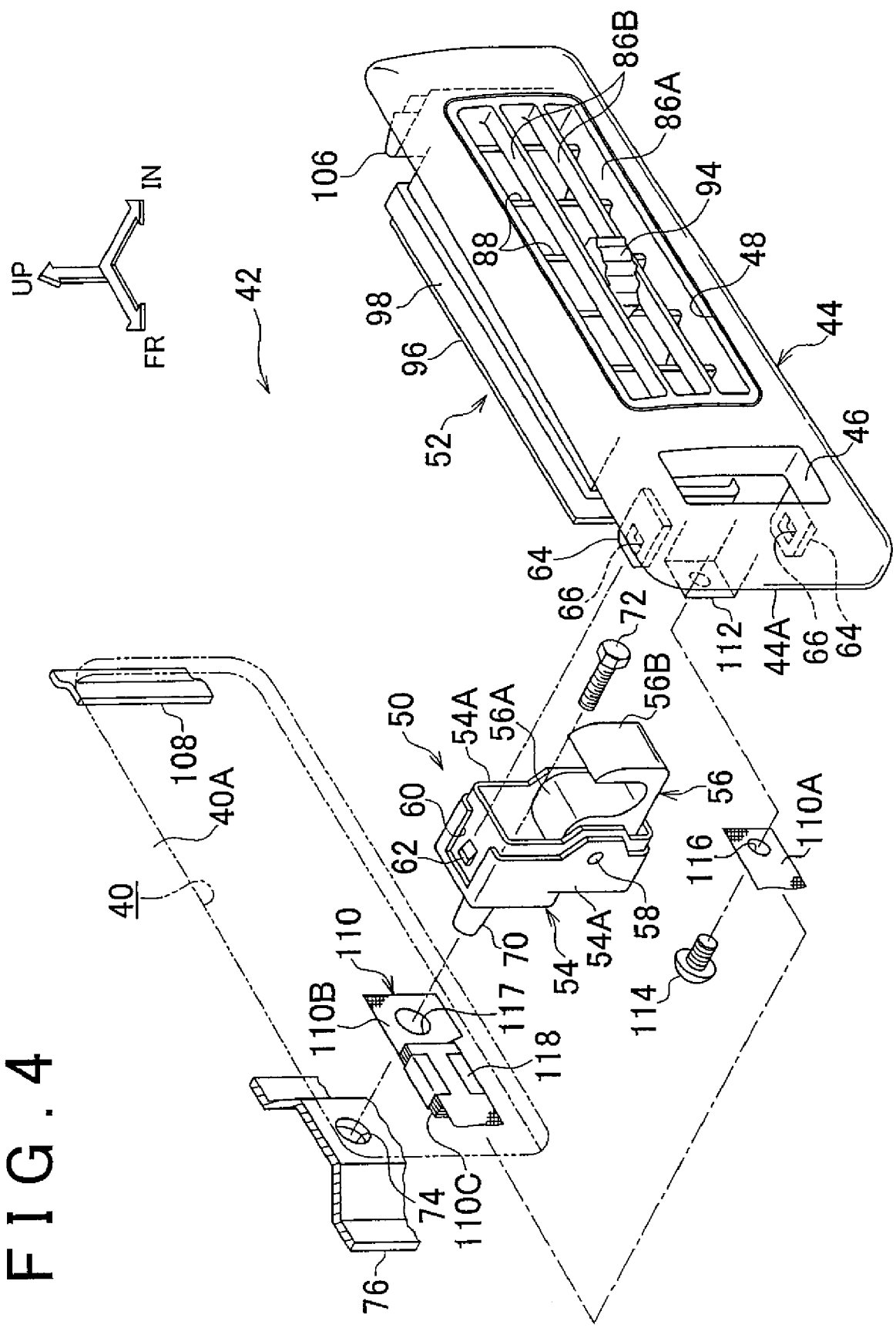
FIG. 4 is an exploded perspective view of a coat hook-equipped roof side register shown in FIG. 1.
Figure 5:
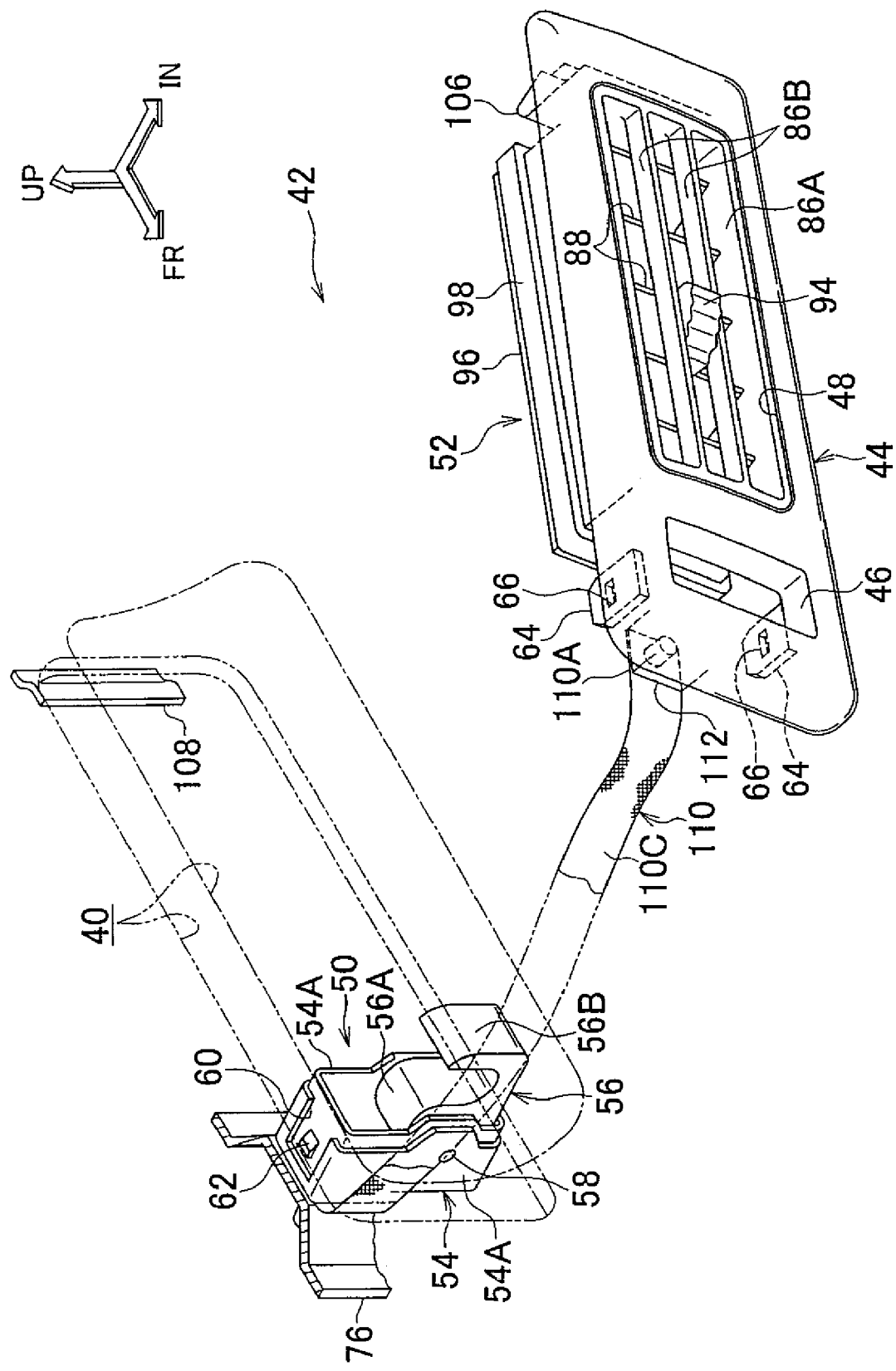
FIG. 5 is a perspective view showing a state where a bezel has fallen apart from an opening portion of a terminal end portion of the headliner, but is retained by a strap connected thereto in the first embodiment.

As shown in FIGS. 4 and 5, the coat hook main body portion 50 includes a generally box-shape case 54, and a hook 56 formed in such a size as to be containable within the case 54. A base portion 56A of the hook 56 is rotatably supported on a rotating shaft 58 spanned between two opposite side portions 54A of the case 54. Incidentally, in FIG. 2, a state of the hook 56 shown by a solid line is a housed state, and a state of the hook 56 shown by a two-dot dashed line is a usage state. The hook 56 can be changed from the housed state to the usage state merely by pushing a hook portion 56B of the hook 56 (a push-open type). When the hook portion 56B is pushed, the hook 56 slowly pivots toward the inner side relative to the compartment about the rotating shaft 58 due to the urging force from urging means and a damper operation. Then, when the hook 56 assumes the usage state shown by the two-dot dashed line, the hook 56 contacts a stopper and is thereby stopped.

A peripheral wall portion of the case 54 has a stepped structure. Rectangular stepped portions 60 are formed on an upper surface portion and a lower surface portion, and each has, at its center, an engaging protrusion 62 that is formed integrally therewith. Correspondingly to this structure, an upper portion and a lower portion of the periphery portion of the first opening portion 46 of the bezel 44 have a pair of upper and lower engaging leg 64 that extend integrally therefrom toward the side of the case 54. Each engaging leg 64 has a rectangular engaging hole 66 that is engageable with a corresponding one of the engaging protrusions 62. Therefore, when the coat hook main body portion 50 is inserted to the side of the first opening portion 46 of the bezel 44, the two engaging legs 64 fit into the upper and lower stepped portions 60 of the case 54, during which process the engaging holes 66 of the engaging leg 64 engage with the engaging protrusions 62 of the coat hook main body portion 50.

Furthermore, an upper portion of a box bottom wall portion 54B of the case 54 has a bolt insert hole 68 (see FIGS. 1 and 2). A grommet 70 is anchored to an outer side surface of the box bottom wall portion 54B, coaxially with the bolt insert hole 68. An axial core portion of the grommet 70 is female-threaded. A mount bolt 72 can be screwed into the grommet 70 from the inner side relative to the compartment by setting the hook 56 in the usage state and inserting the bolt through the first opening portion 46.

Correspondingly, a mount bracket 76 of a hat shape in section in whose central portion has a grommet insert hole 74 through which the grommet 70 can be inserted is welded to the roof side rail inner 26. At the time of assembly, the grommet 70 protruded from the coat hook main body portion 50 is inserted into the grommet insert hole 74. Then, the mount bolt 72 is screwed into the grommet 70. This radially expands the grommet 70, so that the grommet 70 will not fall out of the grommet insert hole 74 of the mount bracket 76. In consequence, the coat hook main body portion 50, which is a main body portion of an interior trim article, is fixed to the roof side rail inner 26, which is a vehicle body, via the mount bracket 76 in the fashion of fastening that is a kind of junction.

In the second opening portion 48 of the bezel 44, on the other hand, the roof side register main body portion 52 is inserted. Concretely, as shown in FIG. 1, a protruded support wall 78 is formed integrally with a peripheral edge portion of the second opening portion 48 of the bezel 44. Forward and rearward positioned portions of the support wall 78 have shaft support holes 80 that are coaxial with each other. A collared bush 82 is fittingly attached to the forward positioned shaft support hole 80. Then, resin pins 84A protruded from two opposite sides of a louver 84 provided in the roof side register main body portion 52 are rotatably supported by the bush 82 on the forward side and the shaft support hole 80 on the rearward side.

Referring to FIGS. 4 and 5, the louver 84 has a rectangular retaining frame 86A that faces the second opening portion 48 of the bezel 44. A plurality of horizontal crosspieces 86B in a vertical arrangement in which the length of the crosspieces 86B lies in the vehicle longitudinal direction are formed integrally with a compartment-side portion of the retaining frame 86A. At the side of the horizontal crosspieces 86B that is outer relative to the vehicle compartment, a plurality of fins 88 having a dogleg shape in a plan view are arranged at predetermined intervals in the vehicle longitudinal direction. Each fin 88 is supported swingably about a support shaft 90 (see FIG. 1) whose axis lies in the vehicle up-down direction. Furthermore, side end portions of the fins 88 which are outer relative to the vehicle compartment are linked to each other by a bar-like link portion 92 that extends in the vehicle longitudinal direction. Besides, a knob 94 for adjusting the degree of opening is mounted on an intermediate portion of a centrally positioned fin 88 in the direction of the height.

A net 96 is placed on a vehicle exterior-side end portion of the rectangular frame-shaped support wall 78 standing from the periphery portion of the second opening portion 48 of the bezel 44 so that the net 96 covers the opening plane of the support wall 78. Besides, a urethane foam 98 of a predetermined width is stuck to an outer peripheral portion of the support wall 78. A duct 100 shown by a two-dot dashed line in FIG. 1 is connected to the support wall 78 via the urethane foam 98 interposed therebetween.

Furthermore, as shown in FIG. 1, an end portion of the bezel 44 opposite from the point of fastening fixture of the bezel 44 to the roof side rail inner 26 is fixed to the roof side rail inner 26 side in the fashion of an engagement that uses a claw or the like. Concretely, a platy rib 102 having a predetermined width is formed integrally with an outer side surface of a rear end portion of the bezel 44, extending therefrom in a direction orthogonal to the plane of the outer side surface. Two side portions of the rib 102 are formed so as to have a U-shape in cross section, and make up a rail 104. An engaging member 106 made up of a leaf spring is inserted in the rail 104. The engaging member 106 has a flat-platy base portion 106A inserted into the rail 104, and a bent-back portion that is bent back from the base portion 106A. The bent-back portion of the engaging member 106 includes a pair of first engaging claws 106B that form two opposite sides of the bent-back portion, and a second engaging claw 106C that is formed in the middle of the bent-back portion and that performs the engagement function together with the first engaging claws 106B. A distal end portion of each of the first engaging claws 106B is bent at a predetermined angle. The second engaging claw 106C has a mount-shape sloped portion whose distal end portion is bent.

A mount bracket 108 of a predetermined shape is provided integrally with the roof side rail inner 26 so as to be engageable with the first engaging claws 106B and the second engaging claw 106C of the engaging member 106. The mount bracket 108 is protruded from the position of the roof side rail inner 26 toward the inner side relative to the vehicle compartment.

As the bezel 44 is fitted into the opening portion 40 of the terminal end portion 34A of the headliner 34, an edge of the mount bracket 108 elastically deforms the sloped portion of the second engaging claw 106C while sliding on the sloped portion. When the edge of the mount bracket 108 moves over the mountain portion of the sloped portion and reaches a valley or foot portion, the edge is hooked on the bent portions of the first engaging claws 106B, so that the edge of the mount bracket 108 clamped by the first engaging claws 106B and the second engaging claw 106C, thus establishing an engaged state.

The aforementioned bezel 44 is fastened together with the coat hook main body portion 50 to the mount bracket 76 by a strap 110 provided as a linking member, as shown in FIG. 5. More specifically, the strap 110 is made up of a cloth member that has a predetermined width. A first end portion 110A of the strap 110 is fixed, by a screw 114, to a prism-shape mount boss 112 that is protruded from an outer side surface of a front end portion of the bezel 44. Incidentally, the first end portion 110A of the strap 110 has a screw insert hole 116. Besides, a second end portion 110B of the strap 110 that is an end portion opposite from the bezel has a grommet insert hole 117 for insertion of the grommet 70, and is disposed on the reverse or outer surface side of the box bottom wall portion 54B of the case 54 of the coat hook main body portion 50. Then, by screwing the mount bolt 72 into the grommet 70 while the aforementioned state is kept, the second end portion 110B of the strap 110 is fastened together with the coat hook main body portion 50 to the vehicle body side, while being clamped between the box bottom wall portion 54B of the case 54 and the mount bracket 76.

Figure 6:
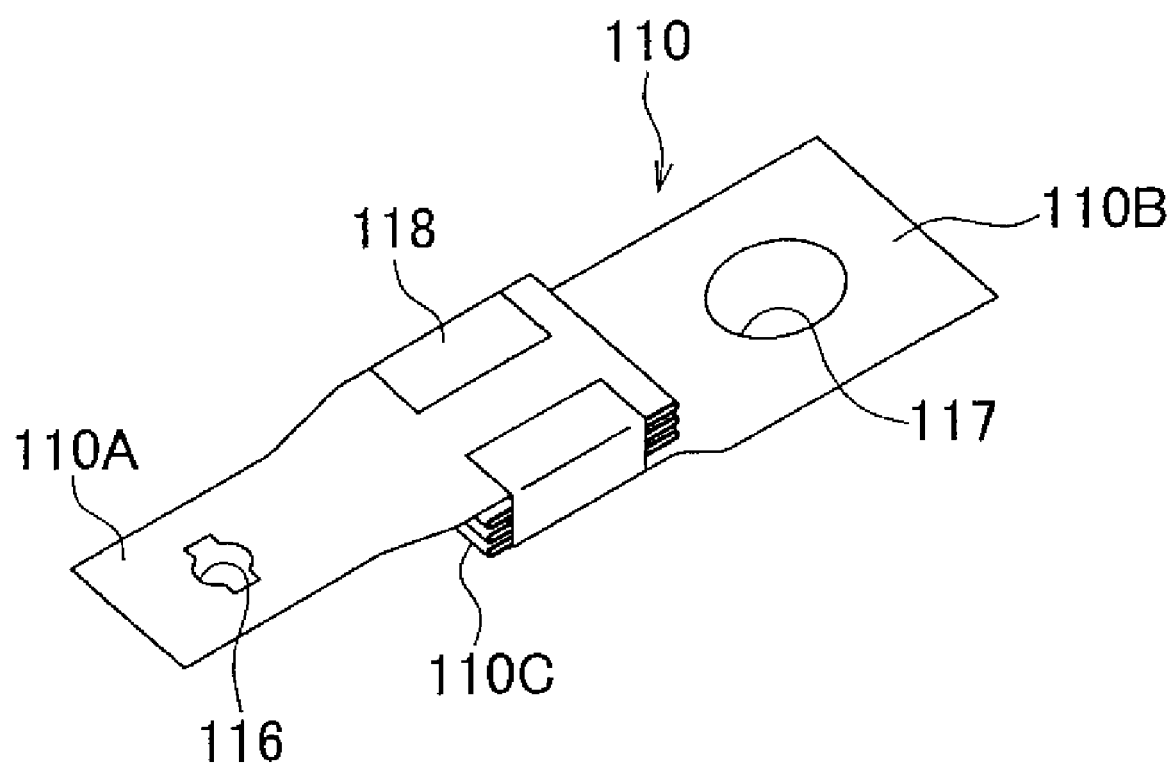
FIG. 6 is a perspective view showing a state where the strap is bundled in the first embodiment.

Furthermore, the entire length of the strap 110 is set to be sufficiently greater than the distance between the fastening fixture point to the coat hook main body portion 50 (the position of fastening by the bolt 72) and the fastening fixture point of the first end portion 110A of the strap 110 (the position of fastening by the screw 114) in the state where the coat hook main body portion 50 and the bezel 44 are integrated. Therefore, the strap 110 has a slack when assembled to the coat hook main body portion 50 and the bezel 40. Therefore, as shown in FIG. 6, the slack portion (a surplus length portion 110C) is repeatedly folded at predetermined lengths. Then, the folded surplus length portion 110C is bundled firmly by a tape 118 so as not to spread. The tape 118 is used as a bundling member that ruptures upon input of a load that is greater than or equal to a predetermined value.

Next, operation and effects of the embodiment will be described.

When the vehicle enters a side collision state or a roll-over state, the state is detected by the side collision detection sensor or the roll-over detection sensor, and is input to the airbag ECU. When the airbag ECU determines that the vehicle is in the side collision state or the roll-over state, the inflator 22 is activated to supply gas into the airbag 20 that is housed in a folded state along the roof side rail 18 of the vehicle. Therefore, the airbag 20 inflates, pushing open the terminal end portion 34A of the headliner 34 toward the inner side relative to the vehicle compartment, so that the airbag 20 is deployed downward of the roof side rail 18 in the fashion of a curtain. In this manner, the front chamber 20A and the rear chamber 20B that are inflated protect occupants' heads.

In this embodiment, the terminal end portion 34A of the headliner 34 has the interior trim article-mounting opening portion 40, and the coat hook-equipped roof side register 42 as an interior trim article is mounted to the opening portion 40. The assembly procedure will be briefly described. After the headliner 34 is assembled to the vehicle body, the coat hook-equipped roof side register 42 is mounted to the terminal end portion 34A of the headliner 34. At this time, the coat hook-equipped roof side register 42 is provided as a subassembly in which four elements, that is, the bezel 44, the coat hook main body portion 50, the roof side register main body portion 52 and the strap 110, are integrated beforehand. Then, the sub-assembled coat hook-equipped roof side register 42 is inserted through the opening portion 40 toward the roof side rail 18 side. Then, the first engaging claws 106A and the second engaging claw 106B of the engaging member 106 are engaged with the edge of the mount bracket 108 of the body side. The hook 56 is changed from the housed state to the usage state, and the grommet 70 is inserted into the grommet insert hole 74 of the mount bracket 76 of the body side. Then, the mount bolt 72 is screwed into the grommet 70. In this manner, the front end side of the coat hook-equipped roof side register 42 in the vehicle longitudinal direction is fixed to the roof side rail inner 26 side by bolt fastening, and the rear end side thereof in the vehicle longitudinal direction is fixed to the roof side rail inner 26 side by the engagement based on the elastic deformation of the engaging member 106. Besides, in the state where the coat hook-equipped roof side register 42 is mounted to the opening portion 40 of the terminal end portion 34A of the headliner 34, a predetermined amount of the periphery portion 44A of the bezel 44 is latched on the periphery portion 40A of the opening portion 40.

Therefore, for example, the central disposition of the inflator 22 as in the embodiment or the high powers of gas from the inflator 22 or the like will give rise to the possibility that, when the airbag 20 inflates and deploys pushing open the terminal end portion 34A of the headliner 34 toward the inner side relative to the vehicle compartment, the force from the terminal end portion 34A may cause the engaging leg 64 that fixes the bezel 44 to the case 54 of the coat hook main body portion 50 and the engaging member 106 that fixes the bezel 44 to the roof side rail inner 26 side to elastically deform in a fall-apart direction so that the bezel 44 may actually fall apart and scatter toward the inner side relative to the passenger compartment. In FIG. 5, the position of the opening portion 40 shown by a two-dot dashed line shows a state where the terminal end portion 34A of the headliner 34 is not pushed open, and the position of the opening portion 40 shown by a one-dot dashed line shows a state where the terminal end portion 34A of the headliner 34 is pushed open to the inner side relative to the vehicle compartment by the inflation pressure of the airbag 20.

However, in this embodiment, if the engaged state maintained by the craws of the bezel 44 is discontinued by deformation of the terminal end portion 34A of the headliner 34 and, therefore, the bezel 44 falls apart from the coat hook main body portion 50 and the mount bracket 108 of the roof side rail inner 26 through the opening portion 40, the bezel 44 merely hangs from the opening portion 40 and does not scatter since the bezel 44 is linked to the mount bracket 76 of the roof side rail inner 26 by the strap 110. Specifically, at the time point when the load input to the strap 110 linking the bezel 44 and the mount bracket 76 becomes equal to or greater than a predetermined value while the bezel 44 is displaced to the inner side relative to the vehicle compartment by the terminal end portion 34A of the headliner 34, the tape 118 bundling the surplus length portion 110C ruptures, and the surplus length portion 110C unfolds and elongates. Thus, even though the bezel 44 falls apart from the opening portion 40, the bezel 44 merely hangs from the opening portion 40 due to the strap 110, but does not scatter.

In particular, in the embodiment, since an intermediate portion of the strap 110 linking the bezel 44 and the mount bracket 76 is provided with the surplus length portion 110C, the high load that acts during an early period of the deployment of the airbag 20 does not act on the fixture point of the coat hook main body portion 50 to the body side (the position of the fastening by the mount bolt 72) although the high load may cause the engaging leg 64 or the engaging member 106 to fall apart or break. Specifically, in this embodiment, since the high load occurring during the early period of the deployment of the airbag 20 is relieved while the surplus length portion 110C of the strap 110 unfolds, the high load during the early period does not act on the point at which the coat hook main body portion 50 is fixed to the mount bracket 76 of the roof side rail inner 26. Therefore, the fixture site of the coat hook main body portion 50 to the mount bracket 76 of the roof side rail inner 26 does not break. In this respect, too, the coat hook main body portion 50 or the bezel 44 will not scatter.

Thus, according to the embodiment, it is possible to more reliably prevent the scattering of the bezel 44 of the coat hook-equipped roof side register 42 disposed in the terminal end portion 34A of the headliner 34.

Furthermore, in the embodiment, since the second end portion 110B of the strap 110 is fastened together with the coat hook main body portion 50 to the mount bracket 76 of the roof side rail inner 26 by the mount bolt 72, the number of component parts and the number of assembly man-hours can be reduced in comparison with the case where the second end portion 110B of the strap 110 is not fastened together with the coat hook main body portion 50 but is independently fixed to the body side at a separate position. In consequence, according to the embodiment, the aforementioned effect can be achieved with low cost.

Furthermore, in the embodiment, since the surplus length portion 110C of the strap 110 is folded and bundled, it is possible to prevent the surplus length portion 110C from tangling at the time of the assembly of the coat hook-equipped roof side register 42, and it is also possible to prevent the surplus length portion 110C from tangling when the strap 110 is unfolded and elongated as the airbag 20 inflates and deploys. In consequence, according to embodiment, it is possible to prevent inhibition of the assembly operation for the coat hook-equipped roof side register 42, and it is also possible to avoid an event where at the time of the inflation and deployment of the airbag 20, the strap 110 tangles so that the high load during the early period of the deployment acts on the junction site between the coat hook main body portion 50 and the mount bracket 76 of the roof side rail inner 26.

In addition, in the embodiment, before the coat hook-equipped roof side register 42 is fixed to the opening portion 40 of the terminal end portion 34A of the headliner 34, the two end portions of the strap 110 are fixed to the coat hook main body portion 50 and the bezel 44. Therefore, the coat hook-equipped roof side register 42, which includes the coat hook main body portion 50, the roof side register main body portion 52, the bezel 44 and the strap 110, can be sub-assembled at a stage before the coat hook-equipped roof side register 42 is assembled to the roof side rail inner 26 side. In consequence, according to the embodiment, it is possible to improve the operability of the assembly of the coat hook-equipped roof side register 42 to the roof side rail inner 26 side, and it is also possible to prevent an event where a component part, such as the coat hook main body portion 50, the roof side register main body portion 52, the bezel 44, the strap 110, etc., is lost at a stage before the coat hook-equipped roof side register 42 is assembled to the roof side rail inner 26 side.

Next, a second embodiment of the interior trim article-mounting structure of a vehicle equipped with a head protection airbag apparatus in accordance with the invention will be described with reference to FIGS. 7 to 9. The same constructions and portions as in the first embodiment are affixed with the same reference characters, and the description thereof will be omitted.

Figure 7:
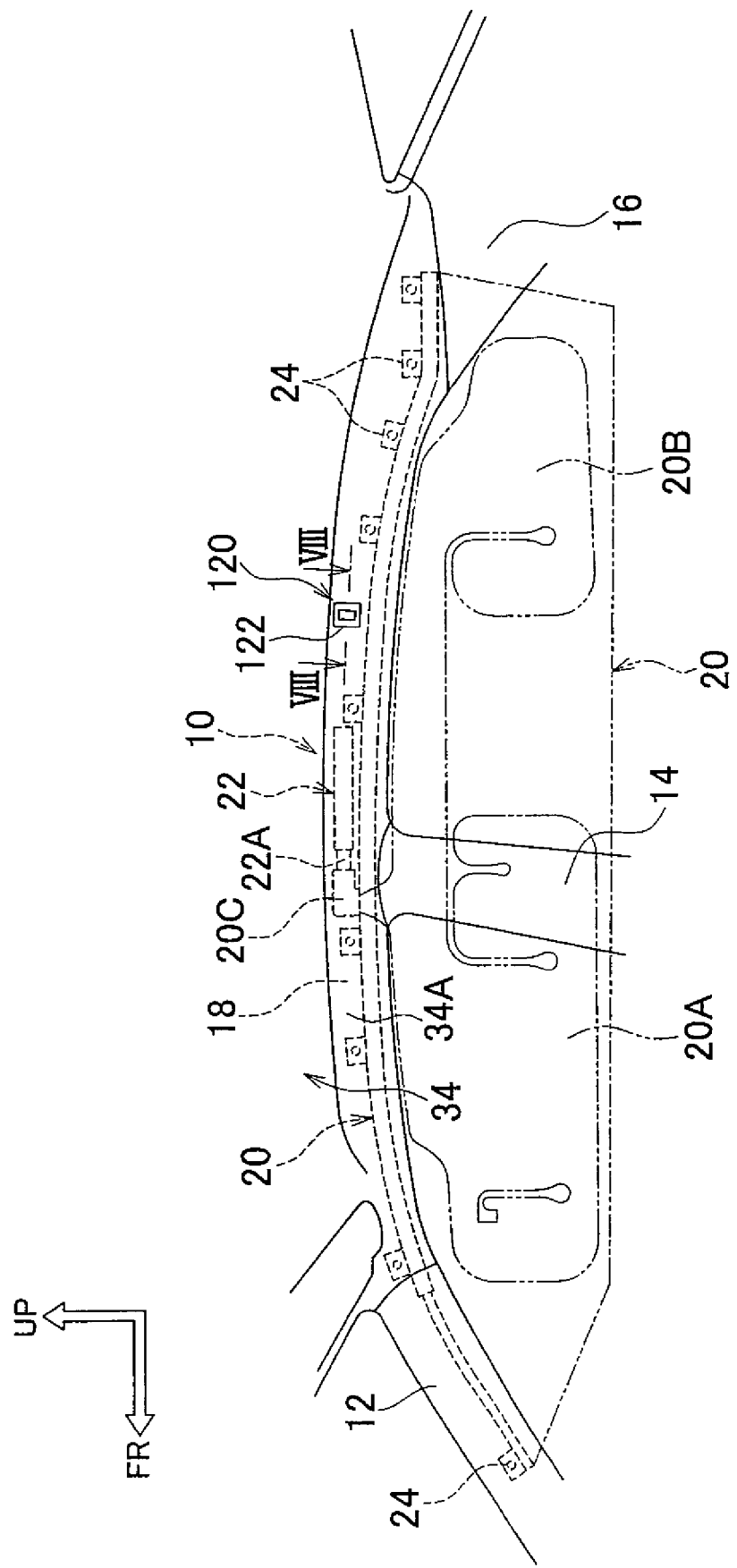
FIG. 7 is a side view of a vehicle equipped with a head protection airbag apparatus in accordance with a second embodiment of the invention, viewed from inside the vehicle compartment.
Figure 8:
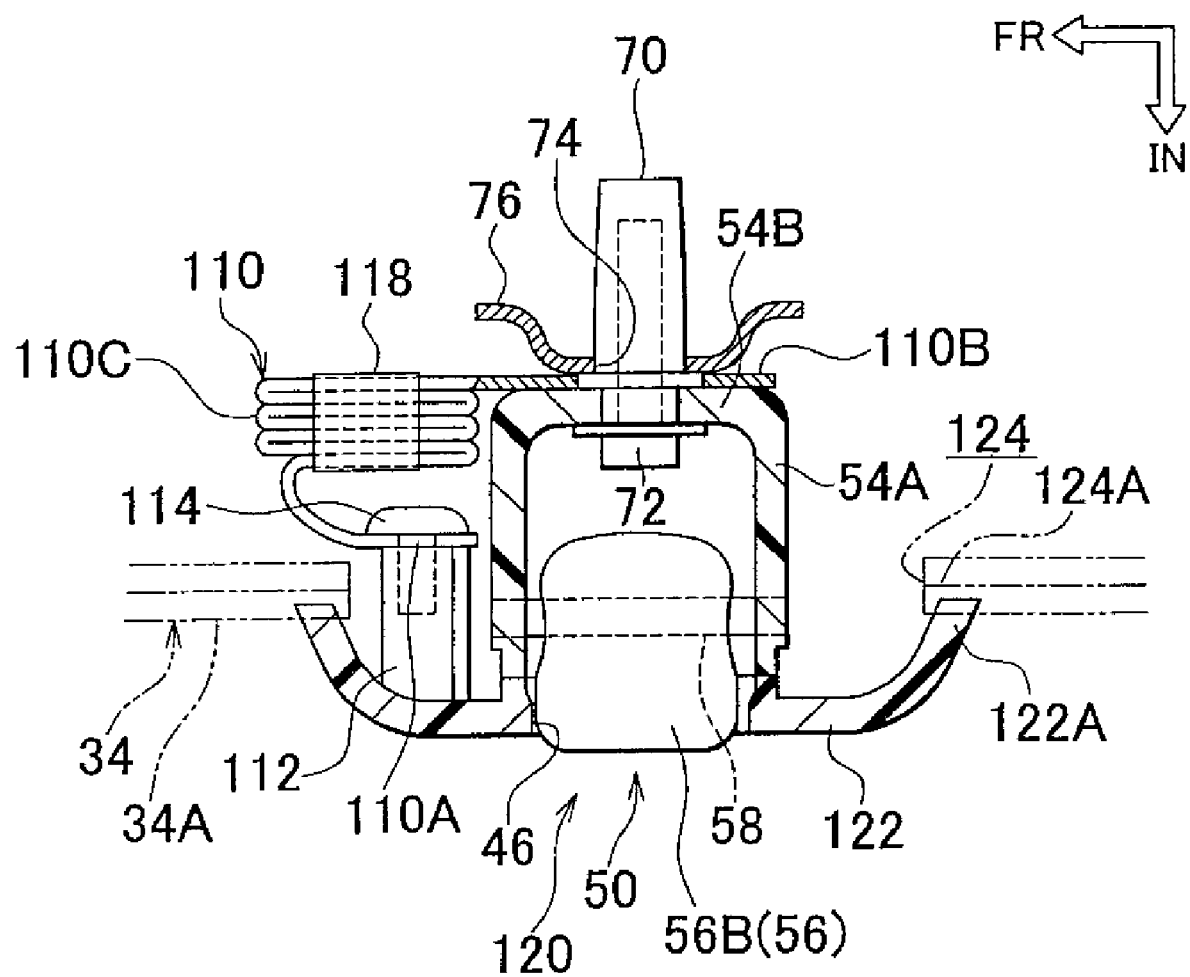
FIG. 8 is a fragmental enlarged sectional view taken along a line VIII-VIII of FIG. 7, showing an interior trim article-mounting structure of the vehicle equipped with the head protection airbag apparatus in accordance with the second embodiment.
Figure 9:
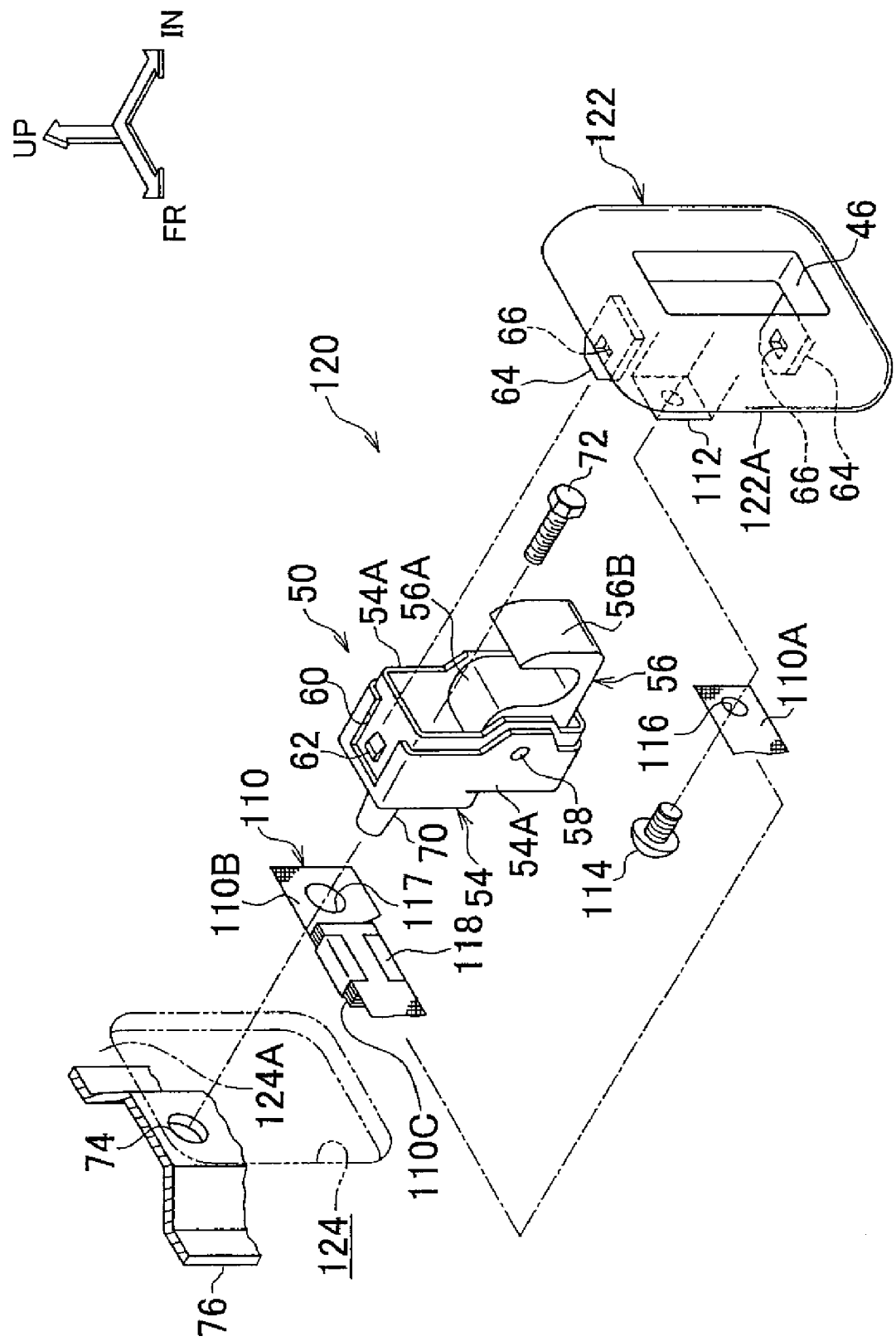
FIG. 9 is an exploded perspective view of a coat hook shown in FIG. 7.

As shown in FIGS. 7 to 9, the second embodiment has features in that an interior trim article is constructed of a coat hook 120 alone. Specifically, the coat hook 120 is constructed of a coat hook main body portion 50 as described above in conjunction with the first embodiment, and a small-size bezel 122. A periphery portion 122A of the bezel 122 is assembled to a terminal end portion 34A of a headliner 34 by latching it on a periphery portion 124A of a small-size opening portion 124 that is formed in the terminal end portion 34A. Besides, in the second embodiment, the bezel 122 is not engaged with the body via an engaging claw formed by a leaf spring, but is fixed by engagement to engaging protrusions 62 only via engaging legs 64 that extend from an upper portion and a lower portion of the periphery of the bezel 122.

In this construction, the operation and effects are the same as in the foregoing first embodiment. That is, even if the terminal end portion 34A of the headliner 34 is pushed open by the airbag 20 so that the bezel 122 falls apart from the opening portion 124, the bezel 122 does not scatter since the bezel 122 is tied to the mount bracket 76 of the roof side rail inner 26 by the strap 110.

Hereinafter, supplementary description of the foregoing first embodiment and second embodiment will be given.

Although the interior trim article in the first embodiment is the coat hook-equipped roof side register 42 and the interior trim article in the second embodiment is the coat hook 120, the invention is not limited thereto. The invention is applicable to any interior trim article as long as the interior trim article includes a bezel that is fitted to an opening portion that is formed in the terminal end portion 34A of the headliner 34. For example, the invention may also be applied to an illumination lamp-equipped roof side register instead of the coat hook-equipped roof side register 42.

Although the foregoing embodiments adopt a construction in which the second end portion 110B of the strap 110 is fastened together with the coat hook main body portion 50 to the mount bracket 76 by the mount bolt 72, it is not altogether necessary to fasten the second end portion 110B together with the coat hook main body portion 50. For example, the second end portion 110B may be fixed to a side wall portion 54A of the case 54 of the coat hook main body portion 50, or may also be wrapped around the mount bracket 76. As for a method of fixing the second end portion 110B of the strap 110 to the side wall portion 54A of the case 54 of the coat hook main body portion 50, the second end portion 110B can easily be fixed if the rotating shaft 58 is formed by a rivet. Besides, as for a method of fixing the mount bracket 76, it is also possible to form a claw by cutting and raising a lug or the like from a sloped surface of the mount bracket 76, and to latch the second end portion 110B of the strap 110 onto the claw.

Although in the foregoing, the linking member is the strap 110, the linking member is not limited thereto, but may also be a string, wire, and the like, and may also be other linking members.

Although in the foregoing embodiments, the bundling member is the tape 118, the invention is not limited thereto. For example, a string may be used, or the folded and superimposed portions may be provided with a weak-adhesion glue for the bundling.

Although in the foregoing embodiments, the mount bracket 76, 108 is provided in the roof side rail inner 26. However, the invention is not limited thereto. Depending on the shape or arrangement of the roof side rail inner, the coat hook main body portion 50 and/or the engaging member 106 may be directly fixed to and engaged with the roof side rail inner. That is, the "roof side rail", as in "fixed by junction to the roof side rail" in the invention, "fixed to at least one of the main body portion and the roof side rail by an engagement", and "a linking member which links . . . or the roof side rail", includes a roof side rail inner itself, a member that is set in the roof side rail inner and is regarded as a member on the roof side rail inner-side member, such as bracket, etc.

Although in the foregoing embodiments, the coat hook main body portion 50 is fixed to the roof side rail inner 26 side by the mount bolt 72, this is not restrictive. Other junction methods, for example, rivet junction, etc., may also be adopted.

The invention claimed is:

1. An interior trim article-mounting structure for a vehicle equipped with a head protection airbag apparatus that includes an inflator disposed at a predetermined position in the vehicle, and an airbag at least a portion of which is housed in a folded state between a roof side rail and a terminal end portion of a headliner, and which, when supplied with gas from the inflator, inflates and deploys downward of the roof side rail, pushing open the terminal end portion of the headliner toward an inner side relative to a vehicle compartment, the interior trim article-mounting structure comprising:

an interior trim article including a main body portion fixed by junction to the roof side rail, and a bezel fixed to at least one of the main body portion and the roof side rail by an engagement that uses an elastically deformable claw;

an opening portion formed in the terminal end portion of the headliner so that the interior trim article is mounted to the opening portion, wherein when the interior trim article is set in the terminal end portion of the headliner, a predetermined amount of a periphery portion of the bezel is latched on a periphery portion of the opening portion;

a linking member which links the bezel and one of the main body portion and the roof side rail, and which is elongated, and whose intermediate portion has a surplus length portion; and a bundling member that bundles the surplus length portion, and that breaks when a load of a predetermined value or greater is input at a time of inflation and deployment of the airbag.

2. The interior trim article-mounting structure for the vehicle according to claim 1, wherein the main body portion is fixed to the roof side rail by fastening.

3. The interior trim article-mounting structure for the vehicle according to claim 1, wherein an end portion of the linking member which is opposite from a bezel side is fastened together with the main body portion of the interior trim article when the main body portion is fixed by fastening to the roof side rail.

4. The interior trim article-mounting structure for the vehicle according to claim 1, wherein an end portion of the linking member which is opposite from a bezel side is fixed to the roof side rail.

5. The interior trim article-mounting structure for the vehicle according to claim 1, wherein an end portion of the linking member which is opposite from a bezel side is fixed to the main body portion of the interior trim article.

6. The interior trim article-mounting structure for the vehicle according to claim 1, wherein the bezel and the main body portion are fixed by engagement between an engaging protrusion provided in one of the bezel and the main body portion and an engaging hole provided in another one of the bezel and the main body portion.

7. The interior trim article-mounting structure for the vehicle according to claim 1, wherein the bezel of the interior trim article and the roof side rail are fixed by engagement between an engaging member, which is provided in one of the bezel and the roof side rail and which is constructed of a leaf spring, and a bracket provided in another one of the bezel and the roof side rail.

8. The interior trim article-mounting structure for the vehicle according to claim 1, wherein an entire length of the linking member is set to be greater than a distance between a fixture position of a first end portion of the linking member and a fixture position of a second end portion of the linking member in a mounted state where the linking member is mounted on the interior trim article, and the surplus length portion is a slack portion of the linking member that occurs in the mounted state.

9. The interior trim article-mounting structure for the vehicle according to claim 1, wherein the surplus length portion is repeatedly folded at a predetermined length, and folded portions of the surplus length portion are bundled by the bundling member.

10. The interior trim article-mounting structure for the vehicle according to claim 1, wherein two end portions of the linking member are fixed to the main body portion and the bezel before the main body portion is fixed to the roof side rail.

11. The interior trim article-mounting structure for the vehicle according to claim 1, wherein the interior trim article is a coat hook-equipped roof side register.

12. The interior trim article-mounting structure for the vehicle according to claim 1, wherein the interior trim article is a coat hook.

* * * * *